(12) United States Patent
Harmon et al.

(10) Patent No.: US 7,756,118 B2
(45) Date of Patent: Jul. 13, 2010

(54) VIDEO SWITCHING SYSTEM UTILIZING A PRIORITIZED COMMON NETWORK

(75) Inventors: Tom Harmon, Sandy, UT (US); Jeff Levie, South Jordan, UT (US); Garn Morrell, Kaysville, UT (US); Roger Thornblad, Sandy, UT (US)

(73) Assignee: Utah Scientific, Inc., Salt Lake City, UT (US)

( * ) Notice: Subject to any disclaimer, the term of this patent is extended or adjusted under 35 U.S.C. 154(b) by 470 days.

(21) Appl. No.: 11/738,471

(22) Filed: Apr. 21, 2007

(65) Prior Publication Data
US 2008/0019388 A1     Jan. 24, 2008

Related U.S. Application Data

(60) Provisional application No. 60/793,845, filed on Apr. 21, 2006.

(51) Int. Cl.
*H04L 12/66* (2006.01)
*H04J 3/16* (2006.01)
*H04N 7/16* (2006.01)
*H04N 9/74* (2006.01)
*H04N 5/268* (2006.01)

(52) U.S. Cl. ............. 370/352; 370/465; 725/135; 725/143; 348/585; 348/705

(58) Field of Classification Search ............. 370/235, 370/351–356, 465; 725/135, 143, 147, 144; 348/585, 705
See application file for complete search history.

(56) References Cited

U.S. PATENT DOCUMENTS

| 4,853,784 | A  | * | 8/1989  | Abt et al. ............. 348/585 |
| 4,858,011 | A  | * | 8/1989  | Jackson et al. ......... 348/705 |
| 7,433,944 | B2 | * | 10/2008 | Kanada et al. .......... 709/223 |
| 2005/0091303 | A1 | * | 4/2005 | Suzuki ............... 709/200 |

* cited by examiner

*Primary Examiner*—Nittaya Juntima
(74) *Attorney, Agent, or Firm*—Everett D. Robinson; Echelon IP, LLC

(57) ABSTRACT

Disclosed herein are system controllers and larger systems incorporating such that can dynamically prioritize critical digital video data streams traveling across a network backbone over other non-priority video data and make the selection of which video streams are to be connected and prioritized through real-time use of video control panel equipment. Detailed information on various example embodiments of the inventions are provided in the Detailed Description below, and the inventions are defined by the appended claims.

27 Claims, 7 Drawing Sheets

VIDEO SWITCHING SYSTEM UTILIZING A PRIORITIZED COMMON NETWORK

CROSS-REFERENCE TO RELATED APPLICATIONS

This application claims the benefit of U.S. Provisional Patent Application No. 60/793,845 filed Apr. 21, 2006 which is hereby incorporated by reference in its entirety.

BACKGROUND

This invention relates generally to high-speed networks that carry digital video traffic and to video switching equipment that may be used in the television/video broadcast industry. The concepts presented herein are best understood with reference to a simple television broadcast example, pictured sequentially in FIGS. 1A, 1B, 1C and 1D.

Pictured in FIG. 1A are certain elements of a television news analog broadcast system as they relate to the switching of live video feeds. In that broadcast system are a number of video feeds; here there are four numbered 10a through 10d. Each of these feeds is input into a video switch 11, which for simplicity of the example is pictured as a matrix crossbar. Switch 11 is controlled from user controls 12, which in this example is a set of four switches. There are two video outputs of switch 11, which include a transmit feed 13a connected to a transmitter 14 and a monitor feed 13b, which may be distributed to those controlling the system.

In this exemplary newscast configuration, feed 10a is from a camera directed to an anchorwoman, feed 10b is from a camera directed toward an anchorman, feed 10c is directed to a first playback device having loaded thereon a first video clip, and feed 10d is likewise directed to a second playback device having a second video clip. In the state shown in FIG. 1A control 12 is configured to selection "1", wherein the output feed 13a is set to the anchorwoman feed 10a and the monitor feed 13b is set to the first playback device feed 10c. This configuration could be used where the anchorwoman was introducing a video clip loaded onto the first playback device.

Momentarily following the anchorwoman's introduction, a person controlling the system presses "2" on the control 12, causing switch 11 to reconfigure into the state shown in FIG. 1B. There, transmit feed 13a is connected to the first playback feed 10c, thereby playing the first clip. In such a system, the pressing of "2" might also cause the first playback device to begin playing the first clip synchronously. Monitor feed 13b is now receiving the anchorman feed 10b in preparation for a switch to him following the first clip.

When the first clip completes either a person controlling the system or automation selects the third state, shown in FIG. 1C. There, the transmitting feed 13a is receiving the anchorman feed 10b, transmitting his introduction, and monitor feed 13b is connected to the second playback feed 10d. While this is happening, a new video clip is loaded into the first video playback device, which is shown on its corresponding feed 10c.

When the anchorman is finished, the controlling person selects "4" on the controlling device to bring the system into the state shown in FIG. 1D, with the transmitting of the second video feed 10d and the monitor 13b set back to the anchorwoman feed 10a in preparation for the next transition back to the state shown in FIG. 1A.

Now although this example is far too simple for real newscast practice, it serves to illustrate several important concepts.

First, although the exemplary newscast system could be automated, it is generally undesirable to do so. Newscasts are planned events, with a number of news stories selected and scheduled for time. However, unless portions of the newscast are pre-recorded, it is generally not known how long segments will be. This is particularly true of newscasts, where anxiety, a cough or any other number of factors can cause a person under live transmission to shorten or lengthen the desired length of their segments. Thus, if the length of a live segment were set in advance, a person being broadcast might have his words cut off at the end or might end too quickly leaving an uncomfortable pause.

Note however, in the example presented here, that some portions of the broadcast can be automated, namely the transitions following a pre-recorded clip. In fact, for prepared materials automation may be more desirable to avoid human-introduced errors into the broadcast.

The last point made in connection with this example is that switches, such as 11, vary widely and are normally configurable by the end-user. Thus, the connections of the crossbar of switch 11 would have been configured in advance of the news broadcast for the sequence illustrated in FIGS. 1A through 1D, which for modem equipment would be performed by programming rather than a mechanical setup.

Now referring to FIG. 2, although video switching systems vary widely, they all have the following elements. First, there are a number of video feeds 20a to 20n, which number will vary depending on the purpose for which the system is used. For example, a video production company might have a largely self-contained system having less than ten total video feeds. On the other hand, a satellite or cable broadcasting company would likely have hundreds or even thousands of feeds. It will be desired to select from those feeds and consume a portion of those feeds in consumers 22a to 22n. Those consumers might be, for example, transmitters, modulators, monitors or recording devices. One or more video switches 21 will be configured to select the video feeds in accordance with one or more controlling devices 23. Here although in a simple setup only one video switch 21 and one control device 23 are shown, it is to be understood that any of the video switching systems described herein might incorporate any number of those devices, for example by daisy-chaining or other techniques.

The examples given so far are especially suitable for analog video transmission, in for example the NTSC or PAL standards. In that mode of transmission, simple switches and relays could be used to implement the switching mechanisms. Today, such switches would use a synchronization signal to avoid switching between video signals in different vertical phases, which signal would be distributed throughout a broadcaster's equipment.

In recent years, digital video transmission has become widespread. Note first, that a system as shown in FIG. 2 could be used for switching between digital broadcast feeds, if desired. Note that, regardless of whether analog or digital video is used, the number of wires or cables 24 is equal to the number of consumers 22a through 22n connected to the switch 1. Thus, a television broadcaster's building would be required to have installed therein many runs of cable to support the wide variety of configurations desired.

The development of high-speed packet-switched networks and digital video has brought certain new developments to video broadcasting. By using a digital network as the conduit for digital video, the duplicity of cabling required by the systems as for FIG. 2 can be avoided. Furthermore, wired and fiber-optic versions of ethernet are now available at a speed of one billion bits per second. With that high bandwidth available, is now possible to transmit several compressed digital video streams effectively over a single wire, which in practice can reduce the number of physical cables of video broadcaster must install by many times.

The system shown in FIG. 2 can be modified to utilize a packet switched network, which modifications are shown in FIG. 3. There, a control device 33 controls a video switch 31 that receives a number of incoming digital video feeds 30a to 30n. Video switch 31 buffers each of feeds 30a to 30n generally so that a frame is available for each feed in the event a switch is made. Alternatively, video switch 31 could receive analog video from one or more of video inputs 30a to 30n and digitally encode those signals. Video switch 31 contains a processor that packetizes the selected video streams and sends that data to a network backbone 35, optionally by way of a network switch or router 36. Further in FIG. 3, two sets of video consumers 32a to 32n and 32s to 32z are connected to network backbone by way of network switch routers 34a and 34b.

FIG. 3 shows a best case scenario for a backbone-based digital video distribution network. This network is efficiently used because there is in effect only one device depositing network traffic, namely video switch 31. As shown, there are no other connections to the video distribution network, which can be done by providing the network infrastructure isolated from other digital networks that may exist in a building. Were additional video sources to be added to backbone 35 network collisions would occur, which would reduce throughput in the network to as little as one third capacity. Assuming that a compressed digital video stream of 20 Mb per second was standard, the capacity of a single gigabit backbone would support a maximum of 16 concurrent video streams. Furthermore, in that system there would be no assurance of fairness of delivery, and packet latencies could vary so much that video data would not necessarily be timely delivered to a consumer. This may be sufficient for a small size video production house that needs only a medium number of concurrent video streams, but is not sufficient for a large broadcaster that may have 20 or more concurrent streams operating at the same time.

To date, the solution to this problem has been to segment a video distribution network into several areas and/or backbones. However, it is desirable to accommodate as many streams on a single network as possible. For example, many buildings are wired to operate a single 10BaseT network, and operating a second network may require a restringing of the wires, cables or fiber optics in a building which can be expensive and time-consuming. Thus there is a need for a system that can reliably transfer digital video streams across a common digital network backbone in a digital broadcasting environment that supports a large number of concurrent transfers.

BRIEF SUMMARY OF THE DISCLOSURE

Disclosed herein are system controllers and larger systems incorporating such that can dynamically prioritize critical digital video data streams traveling across a network backbone over other non-priority video data and make the selection of which video streams are to be connected and prioritized through real-time use of video control panel equipment. Detailed information on various example embodiments of the inventions are provided in the Detailed Description below, and the inventions are defined by the appended claims.

Further described herein are systems for controlling the routing and prioritization of digital video streams configured in a video connection matrix in a packet switched network that optionally includes a high-speed network backbone that include several components including: (1) video switches connected through the packet switched network to a plurality of video sources and video consumers, the delivery of video streams from the video sources to the video consumers being configured in a matrix of possible video connections, the matrix being determined by the operation and configuration of the video switches, (2) a system controller for controlling the routing and prioritization of live video streams in a packet switched network that include a control interface configured to receive video matrix switching commands to alter the video matrix, a video switch interface connected to the video switches operable to transmit video switching commands to the video switches to alter the video connection matrix, a priority control interface configured to transmit communications to a connected router device to prioritize the delivery of a prioritized video stream over the delivery of other network traffic; where the system controller receives and process those video matrix switching commands received through the control interface and to translate received video matrix switching commands into video switching actions and priority control actions, and to transmit video switching commands corresponding to the video switching actions to the video switches; the system controller transmit the video switching commands and priority control commands concurrently, (3) a control device connected to the control interface of the system controller, the control device transmitting video matrix switching commands, (4) one or more router devices embedded in the packet-switched network being operable to accelerate delivery of prioritized packets over the delivery of other non-prioritized packets, the router devices receiving priority commands through the priority control interface.

Additionally, the router devices may prioritize video traffic by: QOS service levels, and optionally change the QOS service level of packets identified for a prioritized video stream to a higher QOS service level as dynamically configured by the system controller; perform ingress queue management or egress queue management; adjust a negotiated bandwidth to achieve port bandwidth management and further wherein said router devices are dynamically configurable through said priority control interface to set a port not carrying a prioritized video stream to a lower bandwidth; selective throttling of port bandwidth; encapsulating priority traffic in a VLAN, or otherwise identify prioritized video stream traffic and to prioritize the transmission of that priority traffic over non-priority traffic. A system may include any of manual controls, software-based controls, GUI controls and automated controls. A system controller may be located to the same cabinet as a video switch or control devices or may be a modular component that is separate from either. The system controller may communicate with the routers using a protocol that is machine-based for efficient network usage, rather than a protocol designed for human interaction such as HTML. The system may include a monitoring function wherein impacts on bandwidth can be monitored and displayed to a user.

BRIEF DESCRIPTION OF THE DRAWINGS

These and other features, aspects, and advantages of the present invention will become understood with regard to the following description, appended claims, and accompanying drawings where:

DETAILED DESCRIPTION

Figure 1A:
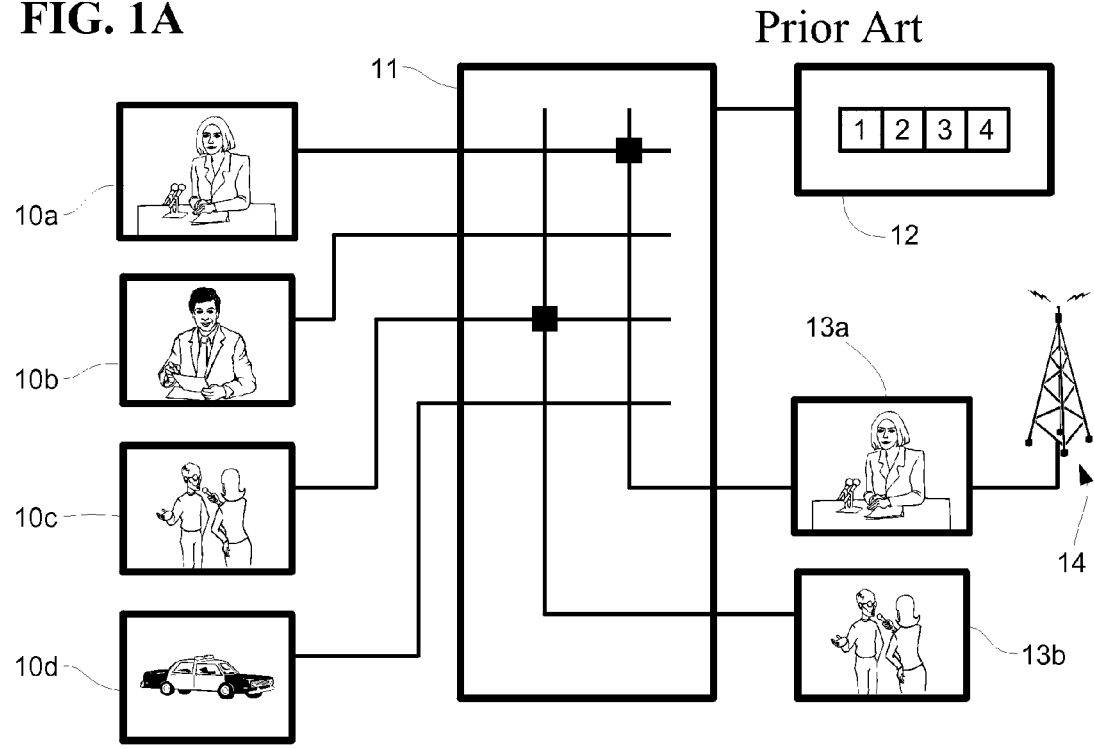
FIGS. 1A, 1B, 1C and 1D show several states of a simple exemplary television broadcast video switch and procedure.
Figure 1B:
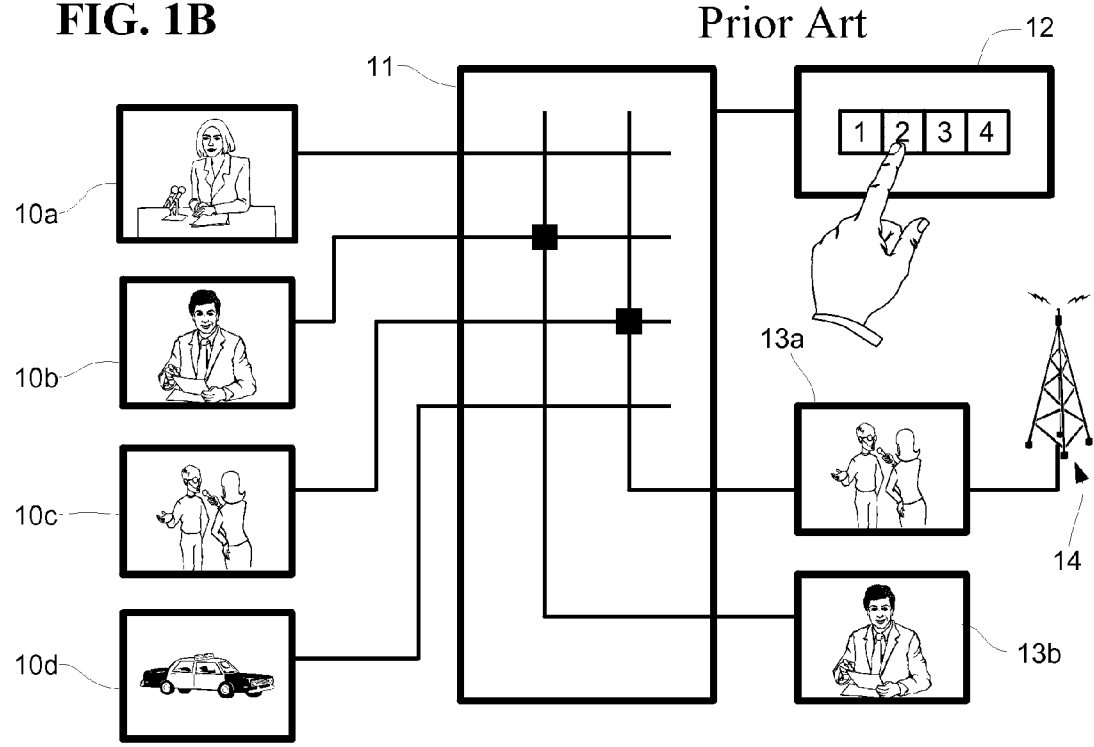
Figure 1C:
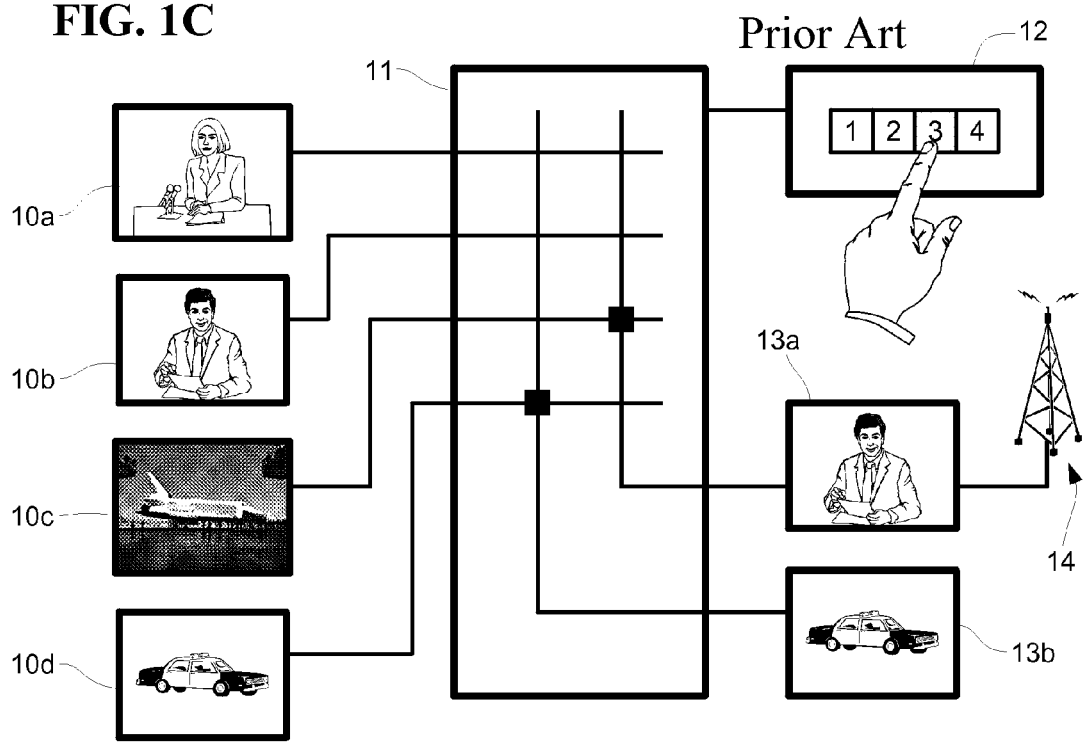
Figure 1D:
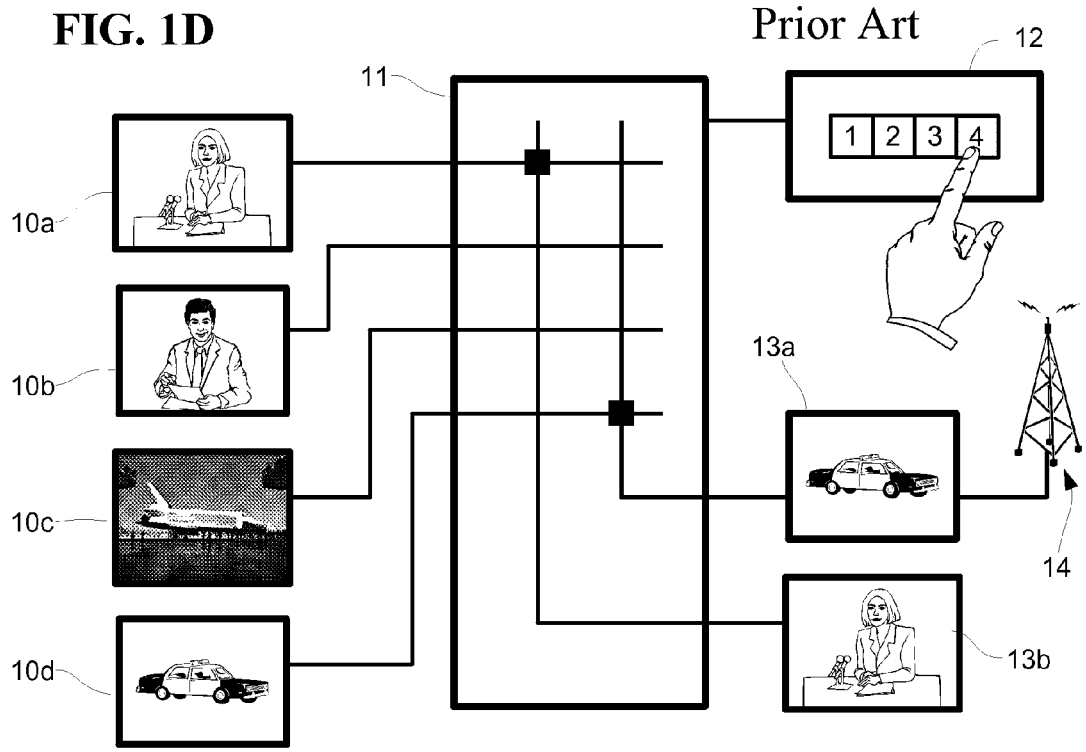
Figure 2:
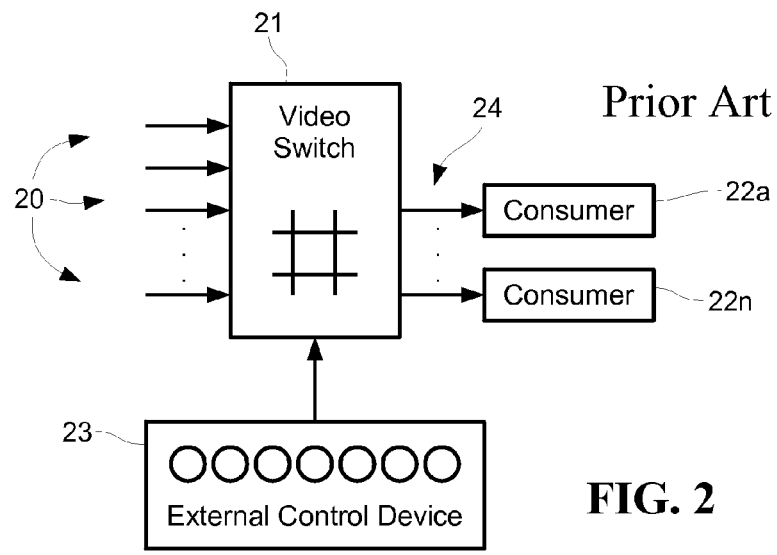
FIG. 2 depicts the common elements of an analog video switching system.
Figure 3:
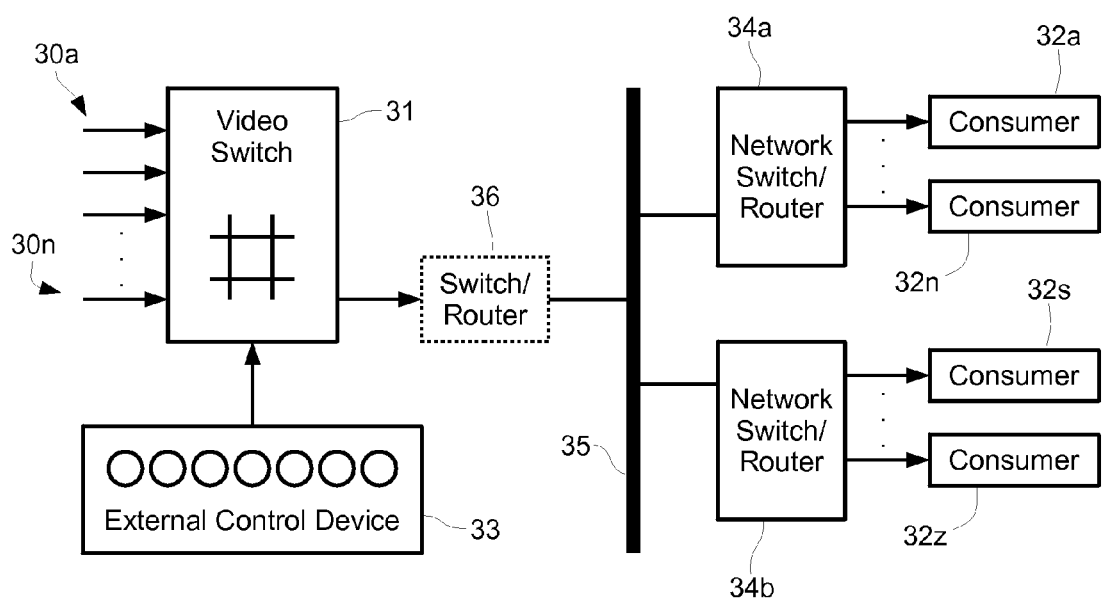
FIG. 3 depicts the common elements of a digital video switching system over a packet-switched network.
Figure 4:
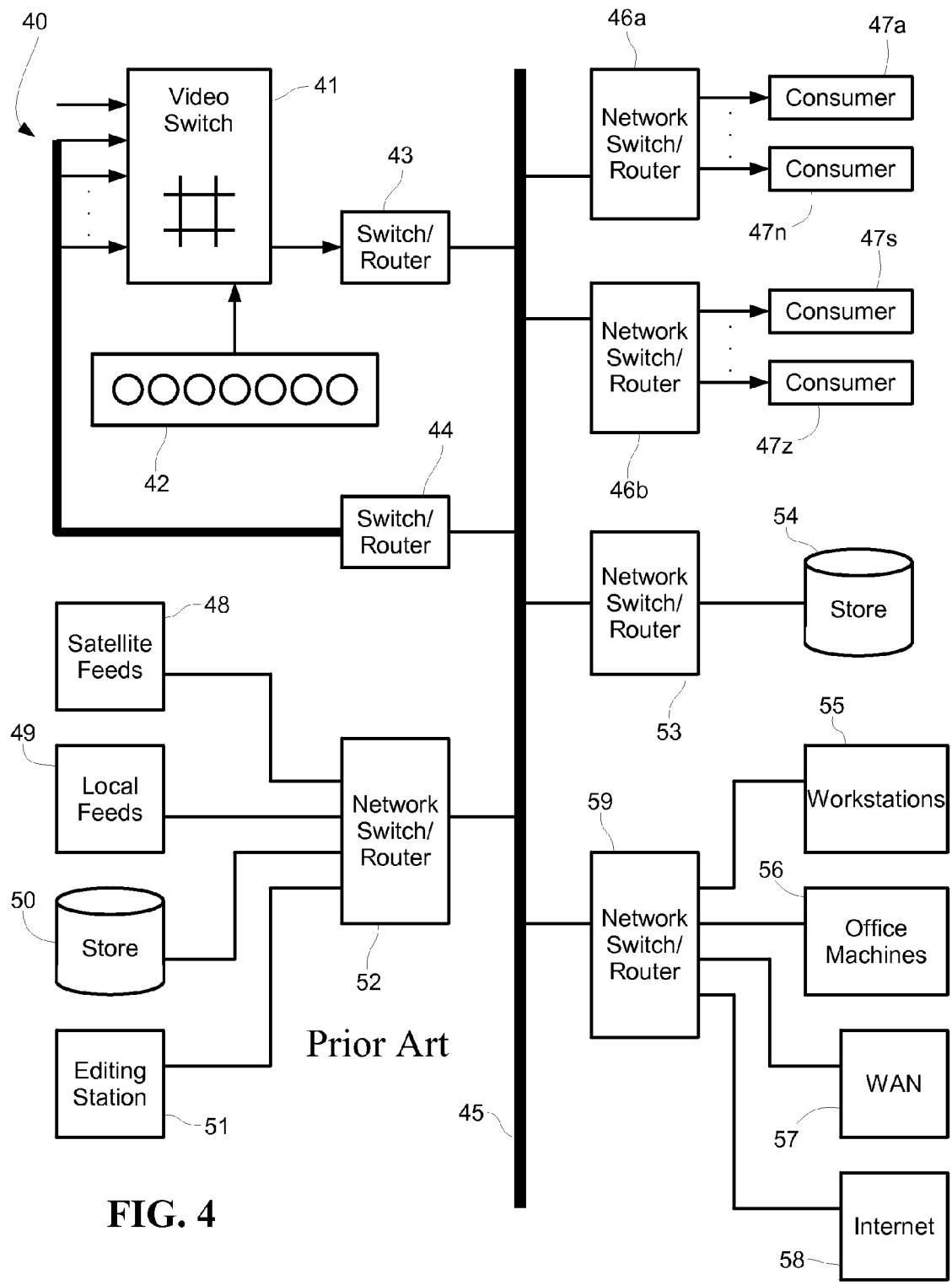
FIG. 4 illustrates a digital video switching system over a packet-switched network that is shared by other resources, both related and unrelated to the production of video.

A discussion of potential environments that can support prioritized switched live video feeds proceeds now in reference to FIG. 4. The reader will recognize several elements that correspond to elements in FIG. 3 including video inputs 40, switch 41 that switches between the video inputs, a control device 42 for controlling the configuration of video switch 41, a network switch or router 43 that transfers video packets from video switch 41 to network backbone 45, and a number of video stream consumers 47a to 47n and 47s to 47z that receive video data by way of additional network switches and/or routers 46a and 46b.

Traditional elements of the system of FIG. 4 include a number of video sources that can supply a video information to video switch 41. These include satellite feeds 48, for delivery a satellite data into the switched system. Also included are local feeds 49 which might be, for example, portable video recorders, local cameras, video carried by terrestrial radio links, and other video sources as desired. Additionally included is a storage device 50 of video material, which could be a network server that stores video files available as delivery as input to video devices in the system. An additional device, video editing station 51 might access video information available on the network and compose video clips to be stored for later delivery, for example in store 50. All of additional devices 48, 49, 50 and 51 are provided under backbone 45 by way of additional network switch or router 52.

Further in the system of FIG. 4, video streams and/or video data is made available to the inputs 40 of video switch 41 by way of switch/router 44. This configuration is distinguished from the earlier examples in that not only feeds that are directly available to video switch 41 provided, but also other video feeds sourced from the network. Consider, for example, that a video stream from a satellite feed is to be provided to a video consuming device 46a. The path taken for that video data will be from feeds 48 to router 52 through backbone 45 to router 44 to video switch 41 to router 43 again through backbone 45 to router 46a and consumer 47a. This illustrates that a video transfer might consume two times or more of the bandwidth of a single video stream of the available backbone bandwidth. Note, however, that in some cases it will be possible to avoid this by directing network traffic directly from the source device to the consuming device (avoiding a circuitous path).

It should also be noted in the configuration of FIG. 4 that certain video transfers can avoid the backbone altogether. For example, if a person were fashioning a video clip from video available on a camcorder, she would be transferring one of local feeds 49 to editing station 51. In that case, router 52 can direct traffic directly between the two devices without communication on the backbone. Suppose, however, that person wish to edit some video material available on store 54. In that case, video data would have to traverse router 53, backbone 45, and router 52 to reach station 51. It can be seen therefore that grouping likely video sources and consumers under a common network switch or router can avoid some network traffic.

Now consider a video distributor that occupies a building with only a single network. In that event the network will further include workstations 55, office machines 56, wide area network connections 57 or connections to the Internet 58. Thus in the example in FIG. 4 all of the video devices in the system are competing with non-video devices or backbone bandwidth. Again, isolating that network activity behind a network switch or router 59 will provide some isolation of non-video traffic, but it is still possible and even perhaps likely that nonvideo traffic will appear on the overall network (for example, if a person were to execute a print job from editing station 51 that printed to one of office machine 56 in this configuration). Were such network activity to occur concurrently at a time when multiple video streams are traversing the network, for example during a newscast, interruption of a video stream could result.

Figure 5:
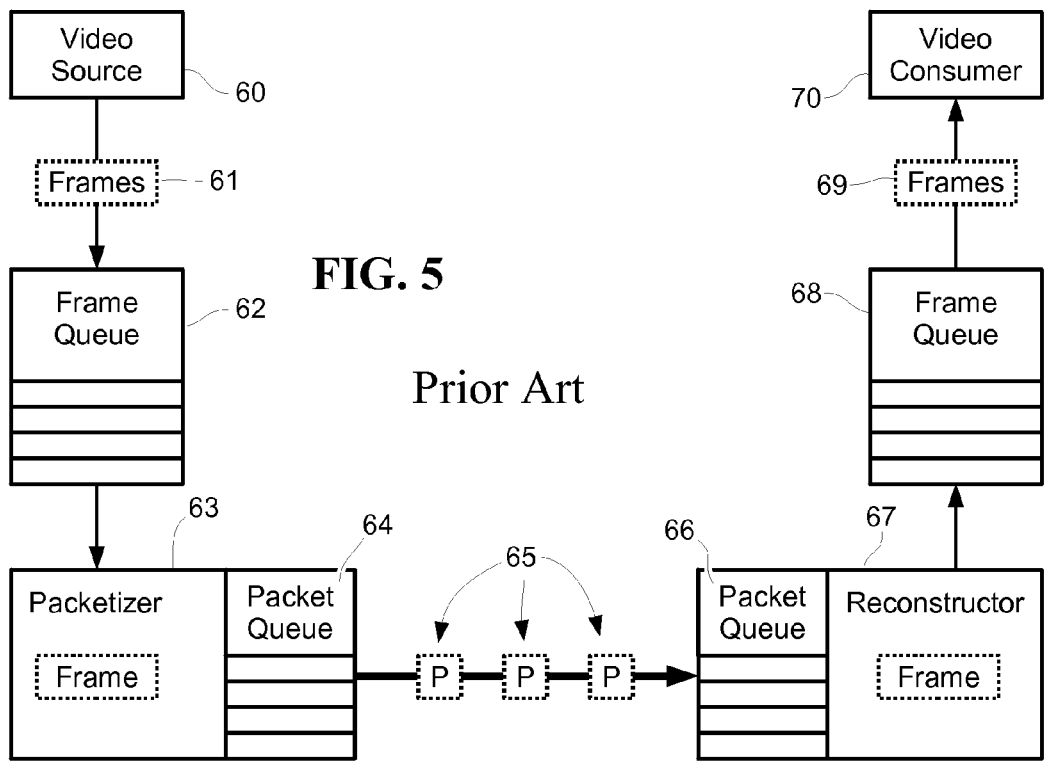
FIG. 5 illustrates a method of carrying video information over a packet-switched network between a video source and a video consumer.

In further consideration of the difficulties of handling multiple video streams over a common network backbone, consider a typical data handling method illustrated in FIG. 5. In the figure, the video source device is the portion on the left and the video consuming device on the right, when considered as a system. Video is produced from a video store 60 which consists of a sequence of frames 61 which are delivered into a frame queue 62 at a certain rate. Rates used in the industry include 25 and 30 Hz for non-interlaced encodings and 50 and 60 Hz for interlaced ones. Therefore, a successive complete frame needs to be delivered within about 33 ms from a prior frame. With digital encodings, the data may not necessarily be successive in nature (i.e. going from top to bottom or bottom to top within a frame), and with compressed encodings parts of the data will rely on other parts and therefore any missing data may cause artifacts within its respective frame. Such artifacts or 'blips' are disturbing to a viewer and are to be avoided.

Continuing further with the system shown in FIG. 5, frame queue 62 may store a number of frames. That number is preferably small so as to avoid any noticeable lag; however there are occasions where a queue may store many frames, especially where the constant rate of delivery needed is not available due to network constraints.

Frames are delivered from queue 62 to packetizer for segmentation and packaging for delivery of packet-switched network. As packets are created they are stored in a packet queue 64 and delivered onto the network generally intermittently 65. Those packets are received at a packet queue 66 and delivered to a re-constructor 67, which re-creates the sequence of frames. The reconstructed frames are delivered into a queue 68 which are then delivered as needed 69 to video consumer 70.

Consider now the effect of an interruption in the delivery of packets 65. If the interruption is sufficiently long, packet queue 66 and frame queue 68 will run dry, and reconstructor 67 will not have sufficient information to construct a complete frame. It is generally desirable to continue to deliver frames 69 to consumer 70, even if those frames are degraded (the failure to deliver a frame may generally cause a duplicated frame to appear to the end viewer, which will manifest itself as a stuttering or momentary stoppage of a moving objects in the video). A reconstructor will therefore make do with the information it has in order to provide at least a partial frame to frame queue 68, should it run dry. But regardless of the behavior of the reconstructor, the result will be either stuttering video or video with artifacts, either of which is annoying to the end-user.

Also consider now that for live broadcasts it will be desirable to keep the frame queues as small as possible, so that the operators of video equipment can react quickly to the live participants. For example, in the newscast example it will be desirable to switch from a live anchorperson to a video clip within about one quarter of one second after he ceases to speak. In terms of frames at 30 frames per second, this amounts to about seven or eight frames. A delay of seven frames, therefore, would increase the transition time between video feeds from about one quarter to about one half second, which would be noticeable. It will therefore be desirable for frame queues 62 and 68 to be three or less frames, and better yet only one frame for the most crisp transitions.

Under those conditions, the delivery of packets 65 is especially critical. If those packets are being delivered over a backbone and the backbone is higher than perhaps half capacity, a burst of network traffic longer than a few milliseconds could cause queues to run dry and errors to appear in the delivered video. Is under these conditions that prioritization of video streams becomes most important.

Figure 6:
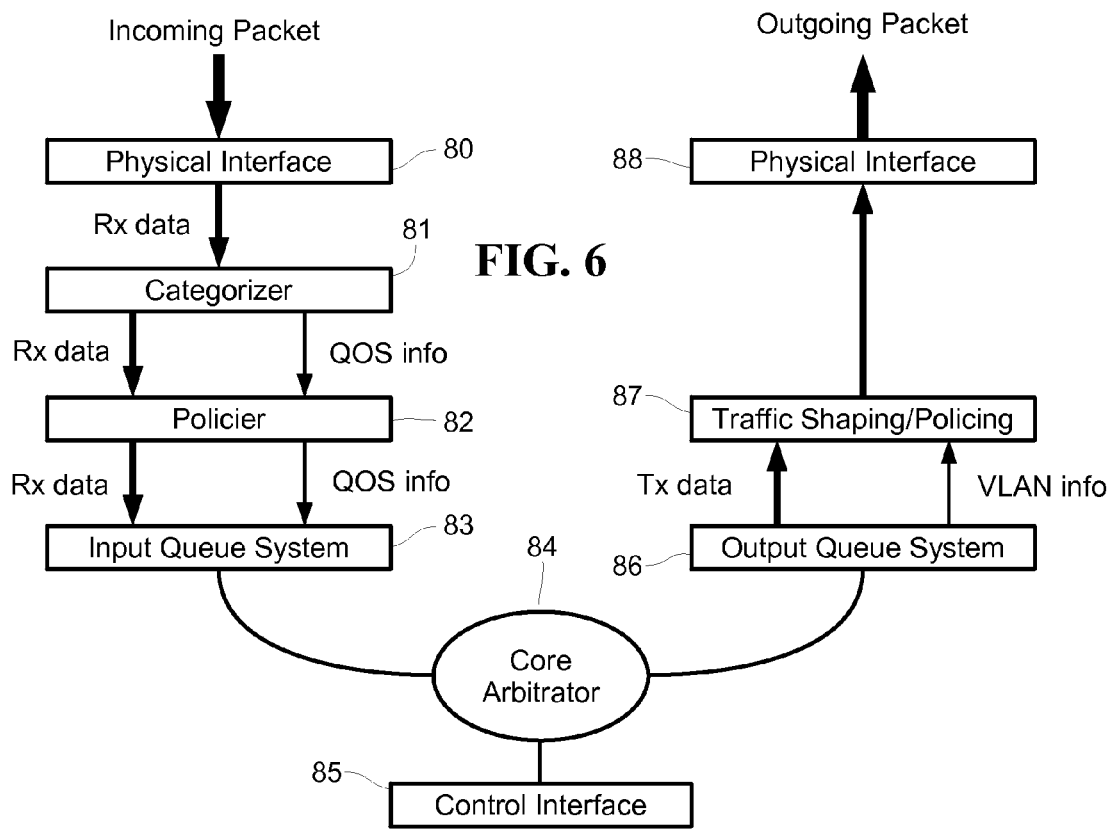
FIG. 6 depicts elements of a prioritizing network switch or router.

Now turning to FIG. 6, a router can be designed that prioritizes network traffic. The router depicted utilizes quality of service information (QOS) to process and prioritize packet data. The flow of packet data is generally as follows. Incoming packets arrive at a physical interface 80, and certain hardware decodes the electrical or optical signals arriving in the physical interface. Categorizer 81 separates the decoded data into its component parts, which include an Rx data payload and QOS information. A categorizer may also be able to change the IP QOS parameters of incoming packet data. The QOS information identifies the service associated with the packet, which information is used by policier 82 to identify the relative priority of this packet as compared to others and to insert the packet data into the input queue system 83 in appropriate order.

Packet data is passed to the output queue system 86 in accordance with priority information identified from the QOS. That data is passed to a traffic shaping/policing module 87 that operates the network protocols and optionally attempts to avoid network interface collisions and otherwise efficiently use the network. Module 87 utilizes physical interface 88 to output the packet data in a manner appropriate to the network protocols.

Further in this example, a core arbitrator 84 is used to transfer packets from the input queue system 83 to the output queue system 86. The arbitrator 84 examines the packets in queue 83 to identified which packets should be transmitted first. It may use the QOS information as a priority cue, preferring transmission of high QOS packets before low QOS packets. In other examples arbitrator 84 could be configured to prefer certain traffic having predefined source or destination network addresses. In yet other examples, the router may implement a virtual local area network (VLAN) and limit the transmission of broadcast-type packets (i.e. specifying a range or plurality of destination network addresses) by either not transmitting to ports not on the VLAN or throttling the transmission rate of those packets.

Now, the elements shown in FIG. 6 form only a half-duplex two port router. It is to be understood that a router or network switch may have a plurality of network ports, and the input and output chains may be duplicated many times. Generally, in a network switch a table will be generated that maps network addresses to ports on the device. In that event, ingress and egress queue management can be utilized. For example, one destination address may be configured to be prioritized over other network addresses; in that case packets may be scheduled for first delivery to that prioritized address. Alternatively, a multi-port switch can be configured so that low priority ports transmit at a lower overall data rate than high priority ports. It is to be understood that many schemes of packet prioritization are possible, and that no particular scheme described herein is required for the successful operation of the systems and devices described herein.

Further in the router shown in FIG. 6, a control interface 85 is provided which permits configuration of the arbitrator 84. It is common for a control interface 85 to be provided in certain routers using an ethernet or RS-232 serial protocol. This interface is provided as a means of controlling prioritization configuration of the arbitrator and/or router. This configuration information is generally provided to configure the static behavior of the router, which is more or less permanent to the network setup in which the router is used. For example, a video broadcast studio might configure its routers to prefer packets identified as video generally in the network. There, all video traffic would be delivered with priority as compared to other kinds of traffic such as file transfers, e-mail, HTTP and printer jobs. In other cases, it may be desired to prioritize traffic between two network devices or sets of network devices, for example a set of video sources and video consumers. However, those static configurations are generally not suitable where it is desired to dynamically control the priority of video streams traversing the network.

Figure 7:
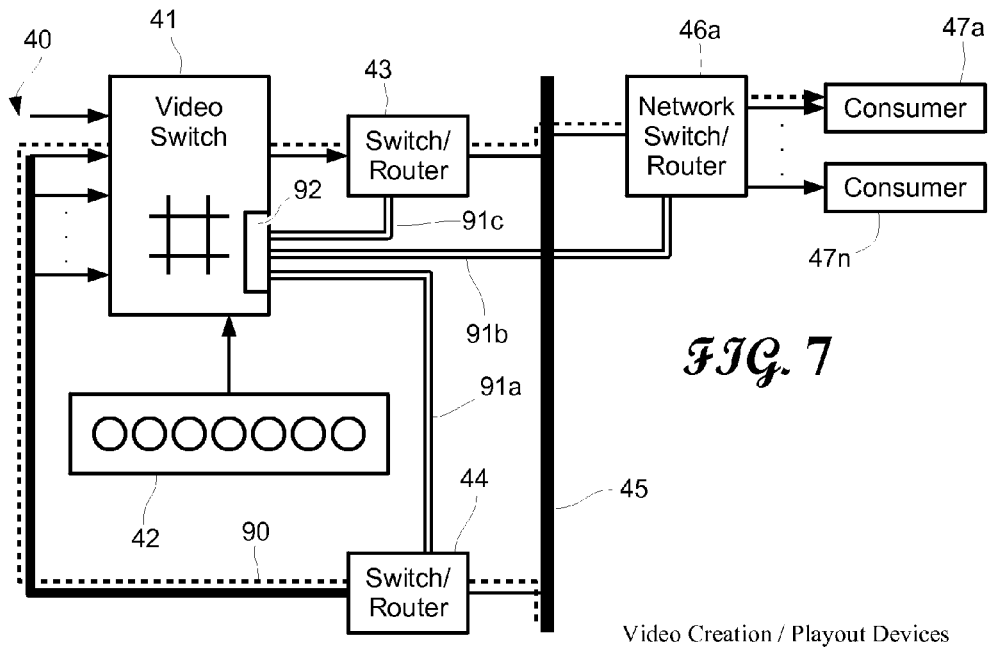
FIG. 7 depicts a digital video switching system modified to prioritize live feeds though the use of a priority control channel.

For dynamic control of video stream priority, the system of FIG. 4 may be modified as shown in FIG. 7. These modifications are as follows. First, video switch 41 had added thereto a priority control interface 92 which is connected to a priority control channel formed by connections 91a, 91b, and 91c a priority control channel runs to one or more switches or routers in the system. Now consider a video feed traveling from a satellite feed from the backbone, switch to the video switch 41 and delivered to consumer 47a, as shown by dashed line 90. As this feed configuration is selected at control 42, video switch 41 delivers a command through connection 91a to router 44 to prioritize traffic and a source address of the satellite input device and the destination address of the video switch 41. Video switch 41 also delivers a command to routers 43 and 46a through connections 91b and 91c to prioritize traffic having a source address of video switch 41 and a destination address of consumer 47a. In this manner priority to video feeds may be made dynamic.

Now, specific form and detail shown in FIG. 7 need not be strictly adhered to. For example, priority interface 92 could be located in a control device 42 or in another device, for example a system controller as described below. Connections 91a, 91b and 91c are shown to be separate from the network on which video is being delivered. For example those connections could be implemented as serial lines that separate from the network cabling. However, this is not required. A priority control interface can be implemented on the same network, which for example might be done using a separate IP port, although existing control protocols for ordinary routers might also be used. Therefore, the delivery of dynamic priority commands may be through any number of ways. Furthermore, existing configuration protocols and methods for IT switches/routers could be used. However, some of these protocols are designed for human presentation (for example over a web browser), and as they are designed primarily for initial static configuration of protocols may not be efficient for dynamic re-prioritization. It may be desirable for switches/ routers that are to be controlled to implement a fast, more machine based protocol to reduce the amount of network data required to make a priority reconfiguration and thus make faster transitions.

Figure 8:
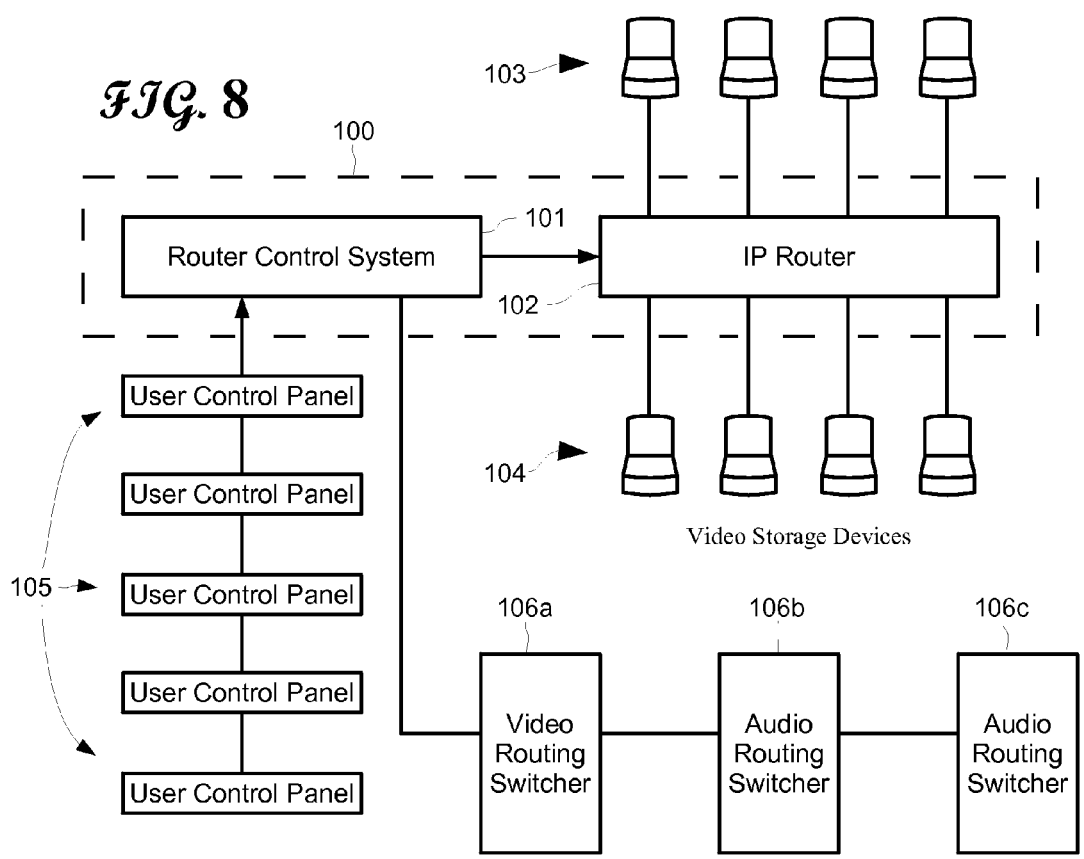
FIG. 8 conceptually shows a digital video switching system that integrates a router control system, an IP router, video storage, creation and playout devices, user control panels and various video and/or audio routers/switchers.

In furtherance of the objectives noted above and other objectives, an exemplary reference architecture has been developed as generally illustrated in FIG. 8. Included in that architecture are three basic components which is one or more router control systems 101, one or more IP routers 102 and one or more user control panels 105. In that system, there are video creation and playout devices 103 and video storage devices 104 for which video traffic is to be either sourced from or delivered to. Other video devices may also be present as described above or otherwise in that network.

In that architecture, user control panels 105 receive human input through the use of manual controls. Those manual controls may be in the form of buttons, switches, levers and other physical control devices, or alternatively user control panels may be implemented in a nonphysical manner through the use of software running on a workstation or other methods. User control panels 105 deliver control signals to the router control systems 101, thereby causing in general two generally concurrent events.

The first of these events is the operation of video switch. In the exemplary system, this is accomplished through the transmission of control signals and/or commands from the router control system to the one or more video routing switchers and optionally audio routing switchers, 106a, 106b and 106c. Note that the precise configuration of video and/or audio routing switchers is a design choice, and no particular configuration is required. This video switching may, of course, be accomplished by an analog switch for analog video, but in digital systems this switch may merely command the configuration of delivery a new digital stream to one or more destination video consuming devices. Regardless of how it is implemented, a user action commanding a video switch is translated into an action for that video switch in the router control system 101. The second of these actions is to alter the priority of network traffic. In this exemplary system, this is accomplished through the sending of one or more priority commands from the router control system 101 to the one or more IP routers 102.

One advantage to the configuration of FIG. 8 is its modularity; the different elements of the architecture may be supplied from different manufacturers so long as common protocols are used. Thus, the IP routers 102 may be a mix of routers from different suppliers, wherein either a common protocol between the router control system 101 and the IP routers 102 is used, or alternatively router control system 101 may be configured to support different protocols as used by different manufacturers. A different supplier may manufacture a router control system 101 that uses a standard protocol to connect to user control panels 105 supplied by the same manufacturer or supplied by a different one. Likewise, switchers 106 may be provided by the same manufacturer or a different manufacturer using a standard protocol. However, note that the router control systems 101 and the IP routers 102 may be located in a common space 100, which may be located in an infrequent access space such as a closet or network operations room. Switchers 106 are more conveniently located near video equipment, while user control panels 105 are best located to a human control center where they can be manipulated.

Specific Exemplary Systems

As described somewhat above, IP routing technology has various features embedded within it that allow a system administrator to grant and monitor Quality Of Service levels, bandwidth guarantees, and isolation from other traffic based upon configuration of various hardware or software devices in an IP communications network. The exemplary systems generally bring this control to the user level, in real time, to account for situations and/or installations in which the configuration demands change at a rate that makes traditional management methods unwieldy. Methods may be used that utilize the manipulation of IP Type Of Service bits (IP TOS), the management of Ingress and Egress queues, port mode configuration, and the implementation of Virtual Local Area Networks (VLAN's) within an IP router to manage network traffic. The controlling device may be implemented in a Utah Scientific Router Control System (RCS). The Utah Scientific RCS is an established product line that has been used to control Audio and Video routing systems for a number of years. It's standard features may be leveraged into the IP routing area to enable the real time control features of the RCS to be used within an IP routing infrastructure.

One method relates to bandwidth or flow control of data on an IP network. Previously, this was accomplished in an inflexible rules based method that does not allow for rapidly changing and conflicting requirements of users of the IP network. Four methods are now described for bandwidth management.

The first of these bandwidth management methods is IP TOS utilization (TOS is synonymous with QOS). TOS identification methods for prioritization of packets may be based on settings in either the packet generating device, the video switching device or an the IP router, which may advantageously be able to reclassify the IP TOS setting of any data received on one of its ports. Through this method a router may identify priority packets, for example by a source or destination network address or source or destination port, and modify the TOS field of those packets for prioritized delivery by subsequent routers in the network. Alternatively, a router need not modify a TOS field if packets are previously presented at higher TOS or if packets can be identified as prioritized, for example by their source or destination addresses.

The second of these methods is ingress and egress queue shaping and policing. Generally, this method uses a function available internally in an ordinary IP router that allows a management system to throttle, or limit, the amount of data that can be received from or transmitted to a particular port (which may also be accomplished by directly limiting the rate of data into its respective queue.) Thus, prioritized traffic may be delivered unthrottled, while traffic on ports carrying non-prioritized traffic are configured by the RCS to be throttled.

The third method uses port mode configuration. Ordinary IP routers can support traffic from remote devices at 10, 100 and 1000 Mb/Sec. Normally, an IP router will auto negotiate with the remote device to run at their highest mutually supported data rate. The IP router can be configured to artificially lower its maximum bandwidth, to lower the bandwidth on non-critical ports. This method is much like the second method, except that throttling is performed by port speed negotiation rather than by another method.

The fourth method uses VLAN implementations. VLANs are used by IP routers to create a Virtual Local Area Network which is a subset of all the ports available on that IP Router. These can be used to isolate 2 or more ports into their own private network, preventing other ports from impacting the quality of the link between that subset of devices. Thus, a router control system can reconfigure the links between routers to protect a video stream carried therebetween by localizing the ports carrying priority traffic into its own VLAN, or by localizing ports carrying non-priority traffic into an isolated VLAN. This method can be particularly helpful where certain kinds of broadcast packets are present in the network system, whereby it is possible to degrade the network.

In the exemplary system, the existing configuration and impacts on bandwidth can be monitored and displayed to the user over an interface connected to an RCS or system controller. The above-described system can be used in many IP based network environments where increasingly large files are moved over bandwidth limited networks, or where critical data must be moved without regard to other traffic, such as in learning institutions, hospitals, banks, and others.

In an even more specific example, a dynamic protocol switching system can be formed, referring again to FIG. 8, using a Utah Scientific Router Control System identified as RCS 101, and more particularly one of models SC4 or SC400. IP routers 102 can be either a Utah Scientific router or other manufacture with corresponding functionality (IP QOS/TOS, Ingress and Egress shaping or VLAN support.) Suitable user control panels 105 are also available from Utah Scientific, and switchers 106 may also be a Utah Scientific router that supports various standards of audio, video or other data routing.

Through the systems and methods described herein users can implement controlled bandwidth paths through an IP routing infrastructure with input into a dedicated control system. The user identifies the port that requires parameter modification, and then selects a function either on a hardware based control panel, a GUI based control panel or through an in band application running on a user work station. At that point, the IP router(s) under the management of the RCS would implement a priority method described above or another priority method. Releasing an invoked function or priority and returning the network to its original state can be accomplished in the same fashion. Permissions to access these functions can be controlled by an RCS, using methods such as passwords, locks and panel specific encoding.

Furthermore, a user control panel may be substituted with any number of user interface devices, including hardware based control panels, GUIs and Automation/Management systems. Hardware based control panels may run an embedded proprietary operating system, and communicate with an established protocol to the System Controller over IP, or proprietary interfaces. GUIs may communicate via an IP network. Utah Scientific products such as SoftPanel, and certain third party applications use this method. Automation/management systems communicate to a System Controller via RS-422 or RS-232 or IP networks. These devices can be third party systems that communicate using established Utah Scientific protocols, such as RCP-1 and RCP-3, which are described below.

Exemplary System Controller Platform

An exemplary system controller is available as a platform for implementing the features and methods disclosed herein. The exemplary controller platform is merely one example for a base design, and need not be adhered to in any degree. That exemplary controller is the SC-4, available from Utah Scientific in Salt Lake City, Utah, which is now described.

Figure 9A:
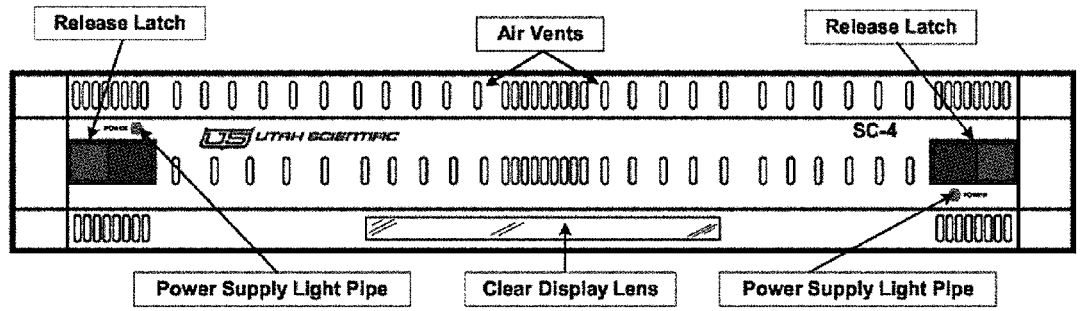
FIGS. 9A, 9B and 9C show an exemplary system controller for controlling a matrix of video channels.
Figure 9B:
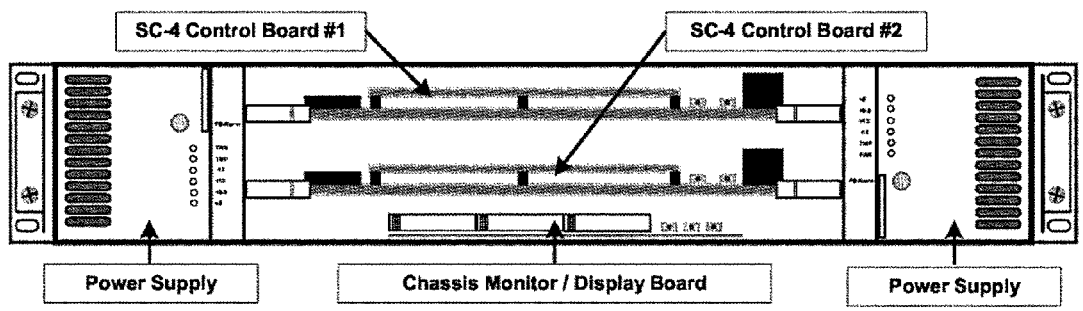
Figure 9C:
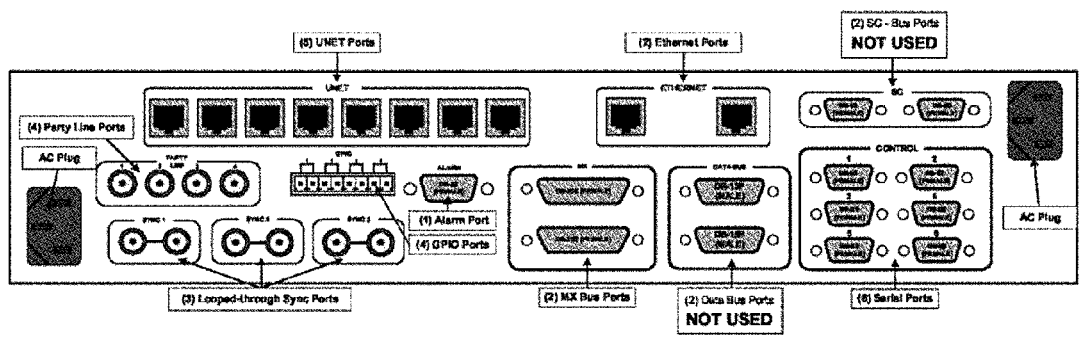

The SC-4 is normally shipped with the following components: a front cover as depicted in FIG. 9A, a chassis, two redundant power supplies and power cords, two redundant control cards, two MX-Bus terminators, eight UNET terminators, a PC to RJ-45 adapter plug and a users guide. Shown in FIG. 9B is an SC-4 chassis with a front cover removed, wherein the dual power supplies, monitoring/display module and dual control boards are visible. The SC-4 provides a number of connectors that the rear, including the MX-Bus connectors, the eight UNET connectors, four BNC party line connectors, three looping sync inputs, to RJ-45 ethernet connectors and six nine-pin D connectors for control signals in either an RS-232 or RS-422 configurations.

The MX-Bus is the router control bus driven by the SC-4. All equipment with MX-bus connections contains two female 25-pin ports. The MX-bus daisy chains from one piece of equipment to the next, with the unused connector on each end of the MX-bus receiving a terminator. MX-bus cables must be terminated at each end of the daisy chain.

The UNET is a panel control bus that interfaces UCP or SCP series control panels to the SC-4. Each UNET port can support up to 32 panels at 1000 feet of cable. Panels can be placed at any one of the UNET ports without regard to Station number, although every panel must have a unique Station number. The UNET daisy chains through the panels, and is terminated either at the back of the SC-4 or at the end of a panel chain with a USI terminator.

Included on each system control board is an RJ-45 debug port operating at 19,200 baud. Each system control board initiates with default settings from the factory, with custom set up being available through commands made to the debug port, and optionally through an ethernet connection. The setup includes a source table and a destination table, MX-Bus configuration, party line configuration and router configuration.

The SC-4, and other system controllers, utilize one of routing control protocols identified as RCP-1, RCP-2 or RCP-3. Through one of these protocols and the system controller, local and remote control of a routing switcher matrix may be achieved. Successive generations of controllers have provided additional functionality and this has required extensions to communications protocols and/or development of new protocols to provide backward compatibility with the earlier versions of controllers; newer controllers commonly support use of both the old and the new protocols. The RCP-1 protocol is an ASCII protocol providing basic router, multilevel control. The RCP-2 protocol is a binary protocol with low overhead; it is used for high-speed single level control for real-time applications. The RCP-3 protocol is a binary protocol that provides the maximum amount of routing switcher control.

A router control protocol is used by an external control device to send commands to a system controller which then sends protocol-based commands to the several routers that may be in the system, whether those be video routers, audio routers or network routers as suggested by the disclosure of certain features and methods herein. The advantages of this arrangement are: complex router mappings may be accommodated by a system controller, and thus the external control devices can be simplified and/or use macro-type commands; matrix types can be made transparent to the external control devices; tie line switching is accomplished in the system controllers; additions to system configurations can be made transparent to the external control devices; and a router may operate with simultaneous control from external control devices and from dedicated control panels.

The RCP-1 Control Protocol is a simple eight level ASCII-based command protocol used for sending commands to and receiving status from a routing system controller. In it there are three types of commands used by an external computer or other external control device to communicate with the system controller. These are: status mode configuration commands, matrix control and matrix status request commands, and miscellaneous system status requests.

In this protocol the system controller can be set to automatically update the external control device with matrix status in several different ways: matrix refresh, which enables automatic status reporting of the entire matrix; matrix change, which enables automatic status reporting in the matrix as changes; and matrix take which reports automatic status whenever a take is made. It is possible to have any combination of these modes acted simultaneously, although typically only one of these is active at a time. That information is provided by the controller to the external control device and service information is available without any specific requests by the external control device. In addition the external control device can specifically request status for an individual output by using the matrix status request command detail below.

A system controller is responsible for storing the matrix status, and routinely updates the matrix with this data to ensure integrity of status and matrix. In the event the board is replaced in the matrix, the original state of the cross points will be assured without manual intervention. This process is continually updating the matrix is none of the refresh cycle. This same process can be provided to the external control device by enabling the matrix refresh report function, which is sent as a command. A similar disable command is also provided.

The matrix change report function causes the controller to issue a status update to the external control device whenever a change occurs in the matrix status. A change in status occurs when a take is made resulting in a change to the status of the matrix. If a take is made to a destination requesting the same sources that are already selected, then this will not cause a change in status, and consequently this will not be reported to the external control device. The system controller reports the status of all levels on the changed output, even if only one level actually changed. Note that the matrix change report is output oriented and issues status reporting related to actual matrix changes issued by the controller, to the matrix, as opposed to the actual changes requested. Consequently if a panel or external controller requests an invalid selection this will not be reported. Also, the RCP-1 protocol is centered around partyline control. Some system controller support additional control panel protocols. If the panel mapping for the additional protocols overlaps the partyline mapping, that the overlapped area, the change information from either type of panel will be properly reported. The result of a salvo take will not be reported unless a UNET protocol panel initiated it and the panel was mapped into the same router space is partyline panels. Both and enable and disable command are provided for matrix change reporting.

The matrix take report function causes the controller to issue a status update to the external control device whenever take occurs, regardless of whether the take changes the state of the matrix. The system controller reports the status of all levels on the changed output. Again, the RCP-1 protocol is centered around partyline control. Takes initiated by partyline panels and serial ports will be reported regardless of mapping. The matrix take report is effectively input oriented respond with a report to requested changes regardless of validity. If a take is made to a destination requesting the same sources that are already selected, this will be reported to the external control device. A salvo take will be reported only as a salvo. The result of a salvo in terms of matrix changes will not be reported. And enable and disable command for the matrix take report function are provided.

The external control device can switch matrix outputs by issuing commands the system controller, as well as recalling the current matrix status from the system controller. Each cross point effectively has an address that is related to the electrical location in the matrix. For example, to select a particular cross point it is necessary to define the input number, output number and the matrix level (a numeric value associated generally with the signal type-video, audio, etc.).

A single take command may select the same input to several levels at the same time and to support this capability the levels are mapped into two characters, each character representing four levels.

Making a selection on the router switching matrix is known as making a take. Switcher cross points are changed by using the matrix take command. The matrix level, input number and output number identify each cross point. The command message includes the command, level 1-4, level 5-8, matrix input and the matrix output.

The matrix status request command provides the external control device with the facility to establish the current status of any specific output or block of outputs in the matrix. The controller will respond with a report consisting of a sequence of status messages ordered by the output number with each message including the following information: level 1-4, level 5-8, matrix input and matrix output. The status of single matrix output may be obtained.

Another command is the current mode and station name request. When a system controller receives this command it responds with the current mode and station name.

The RCP-2 control protocol is a basic router control protocol optimized for applications where real-time switching over a serial interface is the primary requirement. The protocol is binary-based allowing the external controlling device to set Cross points and query the matrix status. Atypical application requiring this type of interface is control from the master control switcher. This protocol is very elementary, supporting only two commands. The external control device can transmit several take commands selecting sources for up to 24 outputs in a single field. To maximize the available communications bandwidth, the controller does not echo or confirm takes in response to a take command. The protocol supports the ability for the external control device to query the controller to determine the state of each output. A series of requests can be sent as a sequence, and the controller will perform operations in the same order as received.

This protocol allows selection of up to 64 destinations in the 128 sources. Individual levels cannot be directly addressed without appropriate matrix mapping. An external control device can switch matrix outputs by issuing commands to the system controller as well as recalling current matrix status from a system controller by use of the two commands described below.

Making a selection on routing switcher matrix is known as making a take. This is accomplished by using the matrix take command. Although level addressing is not supported by this protocol, and All Level Follow does not require levels to be individually addressed. By appropriately setting up the router controller it is possible to make All Level Takes on a multiple level router. Additionally, the breakaway take functionality can be provided in the controller by offsetting physical router outputs on different levels enabling the protocol to uniquely address router levels as if they were an extension of a single level. The take command is a two byte word containing the destination and source data. The MSB of the first word is used to indicate whether the command is a take or status command. The bit is set high for a take command and low for a status command. The second byte of the take command includes a seven bit source address. Bits 0-5 of the first byte determine the destination address.

The matrix status request command provides the external control device with the facility to establish the current status of any specific output. The matrix status request is a single byte word, with the highest order bit set to zero and the lowest six bits containing a destination address. The response is a seven bit source value.

The RCP-3 control protocol is a packet based protocol used for sending commands and receiving status from a router switcher system controller. This protocol can be used to send takes, set attributes, control locks and other actions, as well as monitor status, errors and alarms. These operations enable the creation of a well featured custom control interface to a system controller. To create a custom control interface a client application is created on the external control device. This external device may be a standard PC, workstation, or specially built embedded controller.

In this protocol, each command and status message has a similar packet format, which consists of a header followed by the required data. The header contains information to identify the protocol object being accessed, the command or status type and the length and checksum of the appended data. The data portion contains information based on the type of command or status. Once communication has been established to a controller, it is a relatively simple matter to format and send commands according to a custom control interface. Switch commands transmitted by the external control device are received by the system controller, that will then issue a corresponding command to the router matrix. The successful take will be confirmed by a status message transmitted from the system controller to the external control device. If no status is returned then the operation was unsuccessful, and rather an error message will be returned. A system controller may also generate unsolicited status messages at any time due to operations on panels connected to the controller or by commands received by the controller through serial and network connections.

Network connections for the RCP-3 protocol utilize the standard ethernet TCP/IP protocol using sockets, or a serial connection as described below. To send commands and receive status over a network connection a client socket is first opened with the IP address of a system controller, using a port assigned to the system controller. The external control device in the system controller may be located on the same subnet, or alternatively a gateway may be used. A synchronization pattern in the command stream may or may not be required. According to an exemplary architecture, and the system provides redundant controller boards each using a different IP address. However, only the master board is connected to the network.

Once a socket has been successfully opened, commands can be sent simply by filling a buffer with packet information and writing it directly to the output stream of the socket. Status can be received by reading from the input stream of the socket. A system controller may require receipt of a verbosity message to send response packets back through a socket from which it has received commands. Here, if this message is not sent system controller assumes no verbosity as needed and will silently accept and act on commands it receives.

To make a serial connection to assistant controller using this protocol, a standard RS-232 or RS 422 table is connected to the serial port. Once a serial port has been connected and opened on the external command device, commands can be sent by filling a buffer with the packet information and writing them directly to the port preceded by a four byte synchronization pattern. Status can be received by reading from the serial port. Again, the same four byte prefix signals the beginning of each packet. Each command packet is preceded by a fixed length packet header, which will not be further described here.

In this protocol a ping command is provided for verifying the connection between the external control device and the system controller in both serial and ethernet connections. If a system controller is connected, a ping status will be generated.

The take command allows a take to be made on multiple levels of router system. A status packet returned by a controller serves as an acknowledgment that the command was received. The take command includes the following data: a source of 16 bits, a destination of 16 bits, and a level of 32 bits.

The attribute command allows attributes to be set for a destination of a Utah-300 router on multiple levels. The status packet returned by the controller serves as an acknowledgment that the command was received. This command includes the following data: an attribute of 16 bits, a destination of 16 bits, and a level of 32 bits. The attribute is a coded value indicating the type of data available on a channel, which might be analog audio, digital video, left channel, right channel, monaural, stereo, frequency, etc.

The monitor matrix take command allows selection to be made to a Utah-300 monitor matrix on multiple levels. A confirmatory status packet is sent on a successful take. This command requires the following data: a destination of 15 bits and a level of 32 bits.

The disconnect command disconnects a destination on multiple levels. The controller response with a status packet that serves as an acknowledgment that the command was received correctly. This disconnect command will switch a predefined source to the specified destination on an SC-3 controller. The disconnect command includes data of: a destination of 16 bits and a level of 32 bits.

A salvo command is also provided, wherein the controller responds with a status packet that serves as an acknowledgment. The salvo command data specifies a 16 bit salvo.

A status command is provided to request information on the status of a router. The returned message from the controller includes the following information: the maximum sources and the maximum destinations, both in 16 bits.

A get matrix command is provided to request the status of the router matrix to see what sources are connected to each destination. The command and status packet formats differ. In the command the start destination value indicates what destination information is returned on and number destinations indicates how many subsequent consecutive destinations information is to be provided for. This command includes the following data: a start destination value of 16 bits and the number destination value of 16 bits. The controller is to respond with status and multiple packets. Each status packet has the same format as a command but is followed by matrix data. The matrix data consists of two bytes of source information for each of the 32 levels and is repeated for each destination beginning with start destination and ending when when the number destinations has been reached. The returned message includes the following information: the start destination value in the command, and number destination value in the command, and a level source value of 16 bits for each level ranged by the command.

The get matrix attributes command is provided to request the current attributes of the router matrix for each destination. The command and response packet formats differ. The command contains a start destination and a number destination values. The response contains status that can be returned in multiple packets. Each response packet identifies a block of destinations and is followed by the associated matrix attribute data. The matrix data consists of one bite of attribute information for each of the 32 levels and is repeated for each destination beginning with start destination and ending when number destinations has been reached.

A get monitor matrix command is provided to request the status of the router monitor matrix to see what destinations are connected for each level. There is no data associated with this command. The response includes a 16-bit value for each of the 32 levels, indicating the destination for that level.

A set lock command allows a UNET destination to be protected from subsequent takes in a specified manner. This operation is identical to the 0B/1B lock operation of CSP and a partyline panels. In the command of the lock type value specifies the 0B/1B lock type for each level. A bit set is a 1B lock. A bit cleared is a 0B lock. A level contains a bit set for each level that is to be locked. The panel value tells which UNET node number to use as the panel that set the lock. The system will behave just as if a lock were set at a panel specified. The command contains the following information: a lock type value of 32 bits, a level of 32 bits, a destination of 16 bits and a panel of 16 bits.

Get a command is provided to query a controller for lock information. This may be used to identify which destinations are protected by which panels. There is no data associated with this command. The response for this command includes the following data: a start destination of 16 bits, a number destination value of 16 bits, a lock type value of 32 bits, a level of 32 bits, a 16-bit level panel value for each of 32 panels, and a further lock type, level, and 32-value level panel for each subsequent lock. Block data for each destination consists of a lock type, level and two bytes of panel information for each of the 32 levels. That data is repeated for each destination beginning with start destination and ending when number destination has been reached. Each byte of panel information simply tells what panel made the lock for that respective level. Also note that the panel information is only important for 0B locks.

A clear lock command is provided to clear locks on a destination in UNET panels, which have the ability to lock any specific output. The command includes the following data: a lock type value of 32 bits which is not used and should be set to zero, a level value of 32 bits containing a set bit for each level that is to be cleared, a destination value of 16 bits and the panel value of 16 bits which indicates which UNET node number to use as the panel clearing the lock. The control system is to behave just as if a lock were cleared at the panel specified.

A physical disconnect command is provided to disconnect a destination a multiple levels. A controller will respond with a status packet that serves as an acknowledgment that the command was received correctly. The disconnect command will physically disconnect the specified destination in the router hardware provided that the controller supports this command. The command includes a destination value of 16 bits and the level value of 32 bits.

A number of status messages are provided by system controller on several events. A system takes status message is generated in response to any system wide take inclusive of takes made by control panels or other control devices. This message contains a 16 bit source value, a 16-bit destination value in the 32-bit level value.

A system attribute status message is generated by a controller anytime that attributes are changed on any part of a matrix configured in the system controller, inclusive of changes made by control panels or other control devices. This message includes a 16-bit attribute, a 16-bit destination and the 32-bit level values.

A system monitor matrix take status message is generated by a system controller any time monitor matrix takes are made on any matrix configured in the system controller. This message includes a destination value of 16 bits and a level value of 32 bits.

A system lock status message is generated any time lock changes are made that correspond to destinations on any matrix configured in the system controller. A status type of zero means this is a lock set status, while any other value indicates a lock clear status. A lock type value of zero indicates a 1B lock status, while any other value indicates a 0B lock status. The message contains the following information: a panel value of 16 bits, a destination value of 16 bits, a level value of 32-bits and a lock type of eight bits.

A panel error status message may also be generated to indicate any of the following errors: unable to create tables semaphores, refresh enable table too large, refresh table too large, follow table too large, mapping table too large, salvo buffer number out of range, requested and existing panel parameters do not agree, unable to allocate battery backed up panel object parameters, unable to allocate battery backed up panel data tables, unable to allocate refresh enable working buffer, unable to allocate follow working buffer, salvo contains too many entries, and in valid mapping table entry. An error status message may also be generated to indicate any of the following errors: checksum error, unrecognized SC command, unrecognized MX command, unrecognized command, unrecognized group, invalid mapping protocol, unrecognized command received from panel, unrecognized salvo command type, requested and existing UNET parameters do not agree, disconnect protocol is invalid, destination/level already locked (dynamic), panel issuing lock is out of range, lock destination is out of range, invalid block source (static), invalid block type (static), maximum number of static locks exceeded, lock to be deleted cannot be found, bad lock mode, unable to map dynamic lock from router space to UNET space, unable to map lock broadcast from the UNET space to router space, bad talkback destination, same talkback, unable to allocate battery backed up UNET object parameters, unable to allocate battery backed up UNET data tables, unable to instantiate (create) UNET interface object, unable to spawn UNET interface read task, unable to spawn UNET refresh fetch task, invalid UNET reprogramming command, panel base class instantiation (creation) unsuccessful, attribute table too large, unable to spawn heartbeat task, unable to create transmit buffer, unable to spawn write task, multi-command buffer full, output out of range, source out of range, and unable to create semaphore. A redundancy error status message may also be generated to indicate any of the following errors: error opening redundant communication port, unable to write to redundant command queue, unable to read from redundant command queue, never received slave boot message, unable to allocate memory during sync of slave, unable to create task to sync slave, unable to create slave heartbeat task, unable to allocate memory for message to slave, slave heartbeat lost, read error, invalid checksum, bad read sync sequence, overtemperature, SC alarm, PL alarm, fan alarm, ethernet alarm, watchdog alarm, power failure, real-time alarm, power supply alarm 0, power supply alarm 1, power supply alarm 2, power supply alarm 3, slave over temperature, slave watchdog alarm, slave real-time alarm, cannot switch over to slave, received slave command will not slave, slave received non-slave command, no slave present, exception occurred, exception occurred on slave, never received acknowledgment from slave, unable to create task for slave up time-out, slave rebooted, slave removed, master removed, switch to other board, slave added, slave cannot switch. A watchdog error status message would also be generated indicating either a watchdog time-out error or an unrecognized command.

Provision is also made in some system controllers (SC-3) for certain general error status messages which include:

invalid socket ID, invalid interface-cannot set/get message verbosity, unrecognized broadcast verbosity configuration command, unrecognized panel broadcast command, unavailable socket slot, SC object already instantiated (created), requested SC creation parameters out of range, SC object not yet instantiated (created), MX object already instantiated (created), requested MX creation parameters out of range, MX object not yet instantiated (created), PL object already instantiated (created), requested PL creation parameters out of range, PL object not yet instantiated (created), UNET object already instantiated (created), requested UNET creation parameters out of range, UNET object not yet instantiated (created), unrecognized protocol interface, unable to open remote serial communication port, unable to spawn remote serial communication IPO task, unable to create remote serial communication semaphore, error while reading from remote serial communication port, unable to allocate remote serial communication working buffer, unable to close remote serial communication port, remote serial communication packet checksum error, unable to open remote communication socket, unable to bind remote communication socket, unable to listen to remote communication socket, unable to start remote communication socket server task, unable to create remote communication socket semaphore, unable to close remote communication socket, unable to write to remote communication socket, unable to accept remote communication socket connection, maximum remote communication socket connections used, unable to start remote communication socket read task, unable to allocate remote communication socket data buffer, and remote communication socket data checksum error.

It should be recognized that the precise protocol detail is not important for the purposes of implementing a system having the features or methods described herein. However, those details are available for products made by Utah Scientific, under a document entitled Routing Switcher Control Protocols and having U.S.I. part number of 80101-0047 or otherwise.

While the present systems, products and methods have been described and illustrated in conjunction with a number of specific configurations, those skilled in the art will appreciate that variations and modifications may be made without departing from the principles herein illustrated, described, and claimed. For example, where video streams are described, those may or may not include audio streams, audio clips, text or other information. Indeed, the systems described herein may be adapted to replace video streams for audio streams, or other forms of digital communication over a packet-switched network. Therefore the present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed is:

1. A system controller for controlling the routing and prioritization of live digital video streams in a packet switched network, wherein a digital video stream may optionally include encoded audio or other stream data, the packet switched network including at least one router device operable to accelerate delivery of prioritized packets over the delivery of other non-prioritized packets, the delivery of video streams being configured in a matrix of possible video connections between video sources and video consumers, the matrix being determined by the operation and configuration of at least one video switch, the matrix being alterable through the selection of video connections at a control device, the system controller comprising:

a processor;

a control interface connectable to a control device, wherein the control interface is further configured to receive video matrix switching commands to alter the matrix;

a video switch interface connectable to a video switch, wherein the video switch interface is operable to transmit video switching commands to a video switch to alter the matrix;

a priority control interface connectable to a router device, wherein the priority control interface is further configured to transmit communications to the router device to prioritize the delivery of a prioritized video stream over the delivery of other network traffic; and wherein the processor is further configured to receive video matrix switching commands through said control interface and to process those received commands, wherein said processor is further configured to translate received video matrix switching commands into one or more video switching actions and one or more priority control actions, wherein said processor is further configured to transmit video switching commands corresponding to the video switching actions to one or more connected video switches; wherein said processor is further configured to transmit concurrently with the video switching commands priority control commands corresponding to the priority control actions to one or more connected router devices in the packet switched network.

2. A system controller according to claim 1, wherein said processor is configured to send a priority control command of a type selected from the group comprising (i) a modification of QOS service levels, (ii) a prioritization of a queue carrying prioritized video packet traffic, (iii) ingress queue management of a port carrying prioritized video traffic, (iv) egress queue management of a port carrying prioritized video traffic, (v) higher managed bandwidth for a port carrying prioritized traffic, (vi) higher negotiated bandwidth for a port carrying prioritized traffic, (vii) throttling ports not carrying prioritized traffic, (viii) creation of a VLAN encapsulating prioritized video traffic and (ix) identification of prioritized video stream traffic.

3. A system controller according to claim 1 further comprising a monitoring facility that displays impacts on bandwidth to a user.

4. A system controller according to claim 1 further comprising a router component operable to accelerate delivery of prioritized packets over the delivery of other non-prioritized packets, further wherein said processor delivers the priority control commands corresponding to the priority control actions to said router component.

5. A system controller according to claim 4 wherein said router component and said processor are co-located in the same cabinet.

6. A system for controlling the routing and prioritization of digital video streams configured in a video connection matrix in a packet switched network, wherein a digital video stream may optionally include encoded audio or other stream data, comprising:

one or more video switches connected through the packet switched network to a plurality of video sources and video consumers, the delivery of video streams from said video sources to said video consumers being configured in a matrix of possible video connections, the matrix being determined by the operation and configuration of said one or more video switches;

a system controller for controlling the routing and prioritization of live video streams in the packet switched network, including a control interface configured to receive video matrix switching commands to alter the matrix, said system controller further including a video switch interface connected to said one or more video switches, wherein the video switch interface is operable to transmit video switching commands to said one or more video switches to alter the matrix, said system controller further including a priority control interface configured to transmit communications to a connected router device to prioritize the delivery of a prioritized video stream over the delivery of other network traffic, further wherein said system controller is configured to receive video matrix switching commands through said control interface and to process those received commands, wherein said system controller is further configured to translate received video matrix switching commands into one or more video switching actions and one or more priority control actions, wherein said system controller is further configured to transmit video switching commands corresponding to the video switching actions to said one or more video switches; wherein said system controller is further configured to transmit concurrently with the video switching commands priority control commands corresponding to the priority control actions to one or more connected router devices in the packet switched network;

a control device connected to the control interface of said system controller, the control device operable to transmit video matrix switching commands over said control interface; and one or more router devices embedded in the packet switched network, said one or more router devices being operable to accelerate delivery of prioritized packets over the delivery of other non-prioritized packets, wherein said one or more router devices are further connected to said priority control interface.

7. A system according to claim 6, wherein said one or more router devices are configured to prioritize video traffic by QOS service levels, and wherein said one or more router devices are configured to change the QOS service level of packets identified for a prioritized video stream to a higher QOS service level as dynamically configured by said system controller through said priority control interface.

8. A system according to claim 6, wherein said one or more video switches are configured to prioritize video traffic by QOS service levels, and wherein said one or more video switches alter the QOS level on packets to a higher QOS service level for prioritized video traffic.

9. A system according to claim 6, wherein said one or more router devices are configured for ingress queue management and further wherein said one or more router devices are dynamically configurable through said priority control interface to prioritize a port carrying a prioritized video stream.

10. A system according to claim 6, wherein said one or more router devices are configured for egress queue management and further wherein said one or more router devices are dynamically configurable through said priority control interface to prioritize a port carrying a prioritized video stream.

11. A system according to claim 6, wherein said one or more router devices are configurable to select the maximal negotiated bandwidth to achieve port bandwidth management and further wherein said one or more router devices are dynamically configurable through said priority control interface to set a port not carrying a prioritized video stream to a lower bandwidth.

12. A system according to claim 6, wherein said one or more router devices are configurable to selectively throttle port bandwidth to achieve port bandwidth management and further wherein said one or more router devices are dynamically configurable through said priority control interface to set a port not carrying a prioritized video stream to a lower bandwidth.

13. A system according to claim 6, wherein said one or more router devices are configured to identify prioritized video stream traffic and to prioritize the transmission of that priority traffic over non-priority traffic, and further wherein said one or more router devices are dynamically configurable through said priority control interface to receive identifying characteristics of a prioritized video stream.

14. A system according to claim 6, wherein said control device includes manual controls.

15. A system according to claim 6, wherein said control device is an automated control system.

16. A system according to claim 6, wherein said system controller and one of said one or more video switches are located in the same cabinet.

17. A system according to claim 6, wherein said system controller and said control device are located in the same cabinet.

18. A system according to claim 6, wherein said system controller is a modular component that is separate from said one or more video switches and said control device.

19. A system according to claim 6, wherein said priority control interface utilizes a protocol that is machine-based for efficient network usage.

20. A system according to claim 6, wherein said priority control interface does not utilize a protocol designed for human interaction.

21. A system according to claim 6, wherein said control device is software-based and uses a graphical interface for user interaction.

22. A system according to claim 6, wherein said one or more router devices are configured for VLAN communication and further wherein said one or more router devices are dynamically configurable through said priority control interface to create a VLAN that carries prioritized video stream.

23. A system according to claim 6, wherein the system is configured to efficiently use a high-speed network backbone.

24. A system according to claim 6, wherein the system includes a monitoring function wherein impacts on bandwidth can be monitored and displayed to a user.

25. A system for controlling the routing and prioritization of digital video streams configured in a video connection matrix in a packet switched network, wherein a digital video stream may optionally include encoded audio or other stream data, said system comprising:

a packet switched network including a high-speed backbone;

one or more video switches connected through said packet switched network to a plurality of video sources and video consumers, the delivery of video streams from said video sources to said video consumers being configured in a matrix of possible video connections, the matrix being determined by the operation and configuration of said video switches;

a system controller for controlling the routing and prioritization of live video streams across the high-speed backbone of said packet switched network, including a control interface configured to receive video matrix switching commands to alter the matrix, said system controller further including a video switch interface connected to said one or more video switches, wherein the video switch interface is operable to transmit video switching commands to said one or more video switches to alter the matrix, said system controller further including a priority control interface configured to transmit communications to a connected router device to prioritize the delivery of a prioritized video stream over the delivery of other network traffic, further wherein said system controller is further configured to receive video matrix switching commands through said control interface and to process those received commands, wherein said system controller is further configured to translate received video matrix switching commands into one or more video switching actions and one or more priority control actions, wherein said system controller is further configured to transmit video switching commands corresponding to the video switching actions to said one or more connected video switches; wherein said system controller is further configured to transmit concurrently with the video switching commands priority control commands corresponding to the priority control actions to one or more connected router devices in said packet switched network;

a control device connected to the control interface of said system controller, the control device operable to transmit video matrix switching commands over said control interface; and one or more router devices embedded in said packet switched network, said one or more router devices being operable to accelerate delivery of prioritized packets across said backbone over the delivery of other non-prioritized packets, wherein said one or more router devices are further connected to said priority control interface.

26. A system according to claim 25, wherein said system controller is configured to send a priority control command of a type selected from the group comprising (i) a modification of QOS service levels, (ii) a prioritization of a queue carrying prioritized video packet traffic, (iii) ingress queue management of a port carrying prioritized video traffic, (iv) egress queue management of a port carrying prioritized video traffic, (v) higher managed bandwidth for a port carrying prioritized traffic, (vi) higher negotiated bandwidth for a port carrying prioritized traffic, (vii) throttling ports not carrying prioritized traffic, (viii) creation of a VLAN encapsulating prioritized video traffic and (ix) identification of prioritized video stream traffic.

27. A system according to claim 25, wherein said priority control interface utilizes a protocol that is machine-based for efficient network usage.

* * * * *